(12) United States Patent
Suvarna et al.

(10) Patent No.: US 9,277,046 B2
(45) Date of Patent: Mar. 1, 2016

(54) PERFORM AN ACTION BASED ON DIALED DIGITS

(71) Applicant: The Boeing Company, Chicago, IL (US)

(72) Inventors: Shreenivas Rao Suvarna, Clarksburg, MD (US); John R. Haley, Jr., Chantilly, VA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/260,067

(22) Filed: Apr. 23, 2014

(65) Prior Publication Data

US 2015/0312395 A1    Oct. 29, 2015

(51) Int. Cl.
*H04M 1/725* (2006.01)
*H04M 1/2745* (2006.01)
*H04W 76/02* (2009.01)
*H04W 76/06* (2009.01)

(52) U.S. Cl.
CPC ...... *H04M 1/7258* (2013.01); *H04M 1/274533* (2013.01); *H04W 76/02* (2013.01); *H04W 76/06* (2013.01)

(58) Field of Classification Search
CPC .... H04W 76/02; H04W 76/06; H04M 1/7258
See application file for complete search history.

(56) References Cited

U.S. PATENT DOCUMENTS

| | | | | |
|---|---|---|---|---|
| 5,745,553 | A * | 4/1998 | Mirville et al. | 379/201.05 |
| 6,324,273 | B1 * | 11/2001 | Alcott | 379/201.03 |
| 2008/0108333 | A1 * | 5/2008 | Jemison et al. | 455/414.1 |

OTHER PUBLICATIONS

"Gallery Lock Free (media lock)", retrieved from the Internet at http://apps.ilovefreesoftware.com/apps/gallery-lock-free-media-lock, Jan. 31, 2014, [4 pgs].
Gudelli, "Most Useful Android Secret Codes to Know", retrieved from the Internet: Arunkumar's Blog at http://www.arungudelli.com/android-/most-useful-android-secret-codes-to-know, Jan. 31, 2014, [4 pgs].
"Secret Phone (free)", retrieved from the Internet at https://play.google.com/store/apps/details?id=com.p_phone_sf.trial.android, Feb. 8, 2013, [1 pg].
Republic of South Africa Application No. 2011/06107 entitled "Application Mapping System" filed Aug. 18, 2011; Agent's Reference No. P2124ZA01/EV/ih, [32 pgs].

* cited by examiner

*Primary Examiner* — Marcos Torres
(74) *Attorney, Agent, or Firm* — Toler Law Group, PC

(57) ABSTRACT

A method includes receiving, via an input interface of a mobile communication device, user input corresponding to dialed digits. The method includes causing a transmitter of the mobile communication device to transmit a connection signal to a communication network device based on the dialed digits. The method includes determining, at a processor of the mobile communication device, whether the dialed digits are associated with an action based on action information stored at a memory of the mobile communication device. The method further includes when the dialed digits are associated with the action, automatically causing the transmitter to transmit a disconnect signal to the communication network device, the disconnect signal indicating termination of a communication session associated with the dialed digits, and performing the action using the processor.

20 Claims, 4 Drawing Sheets

PERFORM AN ACTION BASED ON DIALED DIGITS

FIELD OF THE DISCLOSURE

The present disclosure is generally related to performing an action based on dialed digits.

BACKGROUND

Mobile communication devices may be programmed to perform actions including making telephone calls and executing an application. Because of the wide range of available mobile communication devices, providing applications that are executable by different devices can be difficult as different device have different hardware and software available on the devices. One issue that arises when developing an application for different mobile communication devices is that different mobile communication devices often have different types of user interfaces. For example, some user interfaces have physical buttons (e.g., a numeric or alphanumeric keypad), others have touch screen interfaces, voice interfaces, or a combination of touch screen, voice, and physical buttons. Because telephone calls have historically been addressed using a sequence of numbers, mobile communication devices are able to receive numeric input.

Some mobile communication devices have been arranged to receive user inputs as a sequence of dialed digits and to launch an application in response to the sequence of dialed digits. Typically, a user provides a particular input to denote the end of the sequence of dialed digits. For example, some mobile communication devices recognize configuration codes which may begin with or end with non-numeric key sequences such as *# or #*#. As another example, some mobile communication devices may receive a "send" command to detect an end of a sequence of dialed digits. In this case, the sequence of dialed digits may be sent to a network (e.g., to initiate a call) in response to the send command. In the case that the sequence of digits is input to launch an application, the dialed digits should not correspond to a telephone number, so the communication network returns an error signal (in response to the send command) which is output by the mobile communication device (e.g., audibly or via a display of the mobile communication device) after the dialed digits are entered. Thus, the error message indicates that the mobile communication device has been instructed to perform an action.

SUMMARY

Disclosed herein are embodiments of a mobile communication device configured to perform an action based on dialed digits. The mobile communications device may be configured to receive dialed digits via an input interface. The mobile communication device may be configured to compare the dialed digits to action information stored in memory. The mobile communication device may perform an action associated with the dialed digits without notifying the user.

In a particular embodiment, a method includes receiving, via an input interface of a mobile communication device, user input corresponding to dialed digits. The method includes causing a transmitter of the mobile communication device to transmit a connection signal (e.g., a call setup signal, such as a Session Initiation Protocol (SIP) message, an initial and final address message (IFAM), or another call set up signal or message) to a communication network device based on the dialed digits. The method includes determining, at a processor of the mobile communication device, whether the dialed digits are associated with an action based on action information stored at a memory of the mobile communication device. The method further includes, when the dialed digits are associated with the action, automatically causing the transmitter to transmit a disconnect signal (e.g., a user equipment initiated detach or end signal to terminate a communication session associated with the call set up signal) to the communication network device, the disconnect signal indicating termination of a communication session associated with the dialed digits, and performing the action using the processor.

In another embodiment, an apparatus includes a processor and a memory. The memory stores instructions that are executable by the processor to cause the processor to perform operations including receiving, via an input interface, user input corresponding to dialed digits. The memory further includes instructions that are executable by the processor to cause the processor to perform operations including comparing the dialed digits to action information stored at the memory of the mobile communication device. The operations further include determining, at the processor, of the mobile communication device, whether the dialed digits are associated with an action based on the action information, and when the dialed digits are associated with the action, automatically performing the action using the processor without transmitting a connection signal based on the dialed digits.

In another embodiment, a computer-readable storage device includes instructions that are executable by a processor to cause the processor to perform operations including receiving, via an input interface of a mobile communication device, user input corresponding to dialed digits. The operations further include causing a transmitter of the mobile communication device to transmit a connection signal to a communication network device based on the dialed digits. The operations further include determining, at a processor of the mobile communication device, whether the dialed digits are associated with an action based on action information stored at a memory of the mobile communication device and when the dialed digits are associated with the action, automatically causing the transmitter to transmit a disconnect signal to the communication network device, the disconnect signal indicating termination of a communication session associated with the dialed digits, and performing the action using the processor.

DETAILED DESCRIPTION

The present disclosure describes a mobile communication device configured to launch an application in response to receiving a sequence of digits entered via an input interface. The application may be launched without notifying a user. For example, the mobile communication device's display may not change when the application is launched. Further, the mobile communication device may launch the application without storing a dialed sequence used to launch the application in a call log or the mobile communications device may delete an entry from the call log. The entry that is deleted may include the dialed sequence, a time stamp for when the dialed sequence was dialed, information about whether the call was successful, and any other data that may identify the dialed sequence. Therefore, the call log may show no record of the dialed sequence. Thus, the user is able to execute the application in an unintrusive manner.

Figure 1:
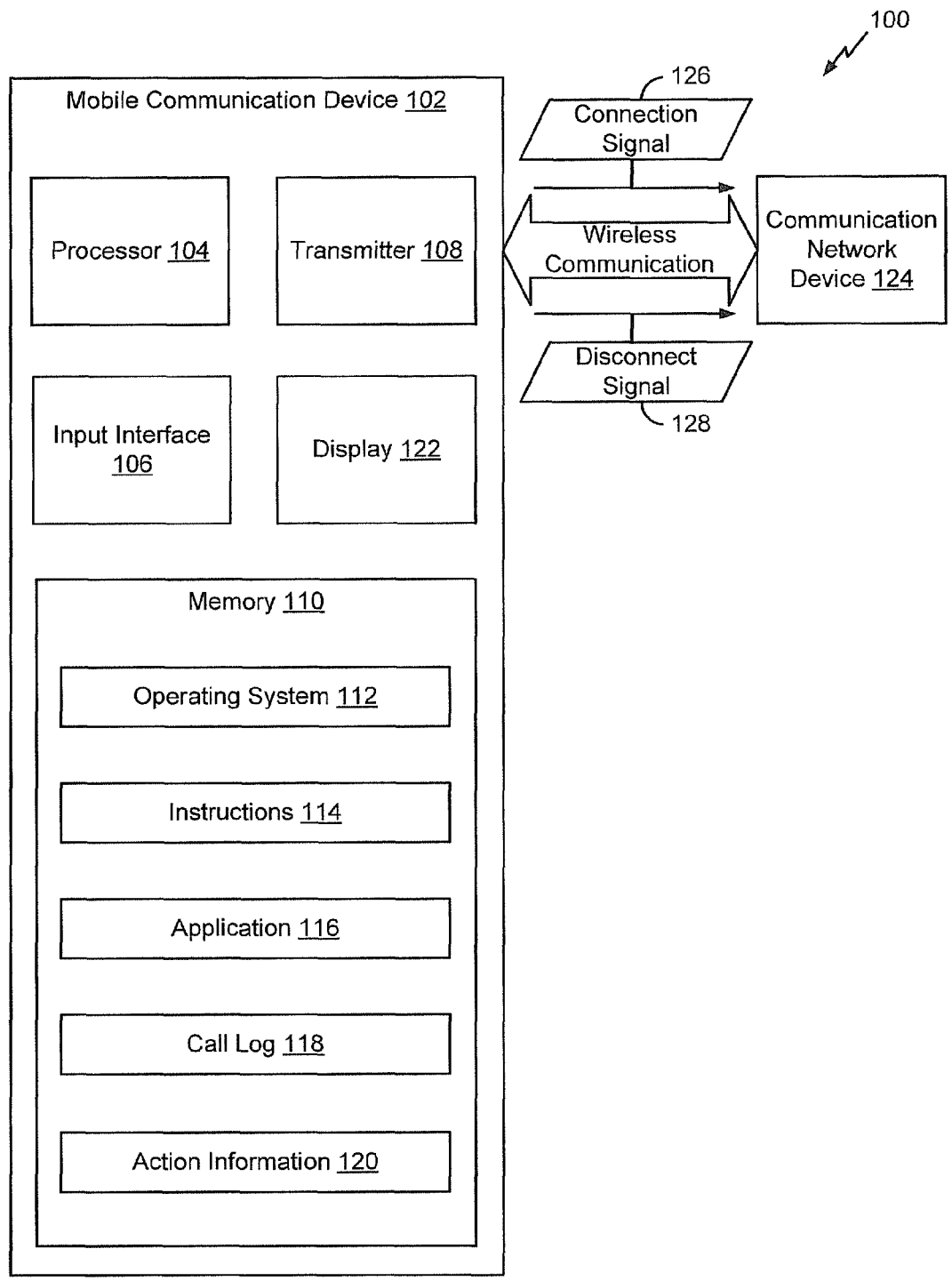
FIG. 1 is a block diagram of an illustrative embodiment of a system configured to perform an action based on dialed digits.

Referring to FIG. 1, a block diagram of an illustrative embodiment of a system configured to perform an action based on dialed digits is shown and designated 100. As shown in FIG. 1, the system 100 includes a mobile communications device 102. The mobile communication device includes a processor 104, an input interface 106, a transmitter 108, a memory 110, and a display 122. In a particular embodiment, the mobile communication device 102 may be a cell phone, a smart phone, a tablet computer, a smart watch, or a laptop configured to perform an action based on dialed digits. The memory 110 may store an operating system 112, instructions 114, an application 116, a call log 118, and action information 120. The instructions 114 may include instructions that are executable by the processor 104 to cause the processor 104 to perform operations according to the various embodiments described with reference to FIGS. 1-3. The instructions 114 may be run at the same level as the operating system 112. In another embodiment, the operating system 112 may be modified to include the instructions 114. The operating system 112 may be any operating system designed for a mobile communication device.

In a particular embodiment, the mobile communication device 102 may receive a user input corresponding to dialed digits via the input interface 106. The input interface 106 may be a physical keyboard, a touch screen interface, or a combination thereof. The processor 104 may cause the transmitter 108 to send a connection signal 126 to the communication network device 124 based on the dialed digits. The connection signal 126 may indicate to the communication network device 124 to start a communication session based on the dialed digits. The connection signal 126 may be any call set up signal sent by the mobile communication device 102 to the communication network device 124 to initiate a wireless communication session, such as a Session Initiation Protocol (SIP) message, an initial and find address message (IFAM), or another call set up signal or message.

The processor 104 may determine whether the dialed digits are associated with an action based on the action information 120. The action information 120 may include an identifier of the action and a sequence of digits associated with the action. The sequence of digits, the action, or both, may be user defined or may be preconfigured (e.g., during the installation of the application 116, action information may be stored). The user may define the sequence of digits during installation of the application 116. The user may change the sequence of digits by entering a predefined sequence of digits followed by the new sequence of digits. The sequence of digits may include any number of digits. For example, the sequence of digits may be the same length as a telephone number or may be a shorter or longer sequence. The sequence of digits, in some embodiments, may also include special characters such as the pound sign or the star sign. In one particular embodiment, the sequence of digits may be restricted to combinations of digits that are invalid as telephone numbers (i.e., 1-800-555-0199).

If the processor 104 determines that the dialed digits are associated with an action, the processor 104 may automatically cause the transmitter 108 to transmit a disconnect signal 128. The disconnect signal 128 may indicate termination of the communication session associated with the dialed digits that was initiated by the connection signal 126. The disconnect signal 128 may be any signal sent by the mobile communication device 102 to the communication network device 124 to end a wireless communication session, such as a user equipment initiated detach or end signal to terminate a communication session associated with the call set up signal.

In one particular embodiment, the processor 104 may save the dialed digits to the call log 118. In this embodiment, the processor 104 may delete the dialed digits from the call log 118 after the dialed digits are detected as associated with the action. In another particular embodiment, when the dialed digits are associated with the action, the processor 104 may not save the dialed digits to the call log 118

After determining that the dialed digits correspond to digits identified in the action information 120, the processor 104 may perform the action. For example, the action may include launching the application 116. The action may not be detectable by the user of the mobile communication device 102. For example, the action may not cause any changes in a displayed image of the display 122, may not cause any sound to be generated, and may not cause the processor 104 to generate any user detectable indication that the application has been launched. Additionally, the action may not result in any record of execution of the application being stored at the memory 110.

In another embodiment, after receiving the dialed digits via the input interface 106, the processor 104 may compare the dialed digits to the action information 120 before sending the connection signal 126. For example, the connection signal 126 may be sent when the user provides a send command (e.g., selects a send button). In this embodiment, the processor 104 may compare the dialed digits to the action information 120 as the dialed digits are entered via the input interface 106 (e.g., without receiving a send command). The processor 104 may automatically perform the action without transmitting the connection signal 126 when the dialed digits are associated with the action. For example, after the send command is provided by the user, the transmitter 108 does not send the connection signal 126 if the dialed digits match digits in the action information 120.

Thus, the system 100 of FIG. 1 may be configured to launch the application 116 in response to a sequence of digits input via the input interface 106. The application 116 may be launched without notifying a user that the application 116 has been launched. For example, the display 122 may not change when the application 116 is launched. Further, the mobile communication device 102 may not store (or could store temporarily and delete) a dialed sequence used to launch the application 116 in the call log 118. Accordingly, the user is able to execute the application 116 in an unintrusive manner.

Figure 2:
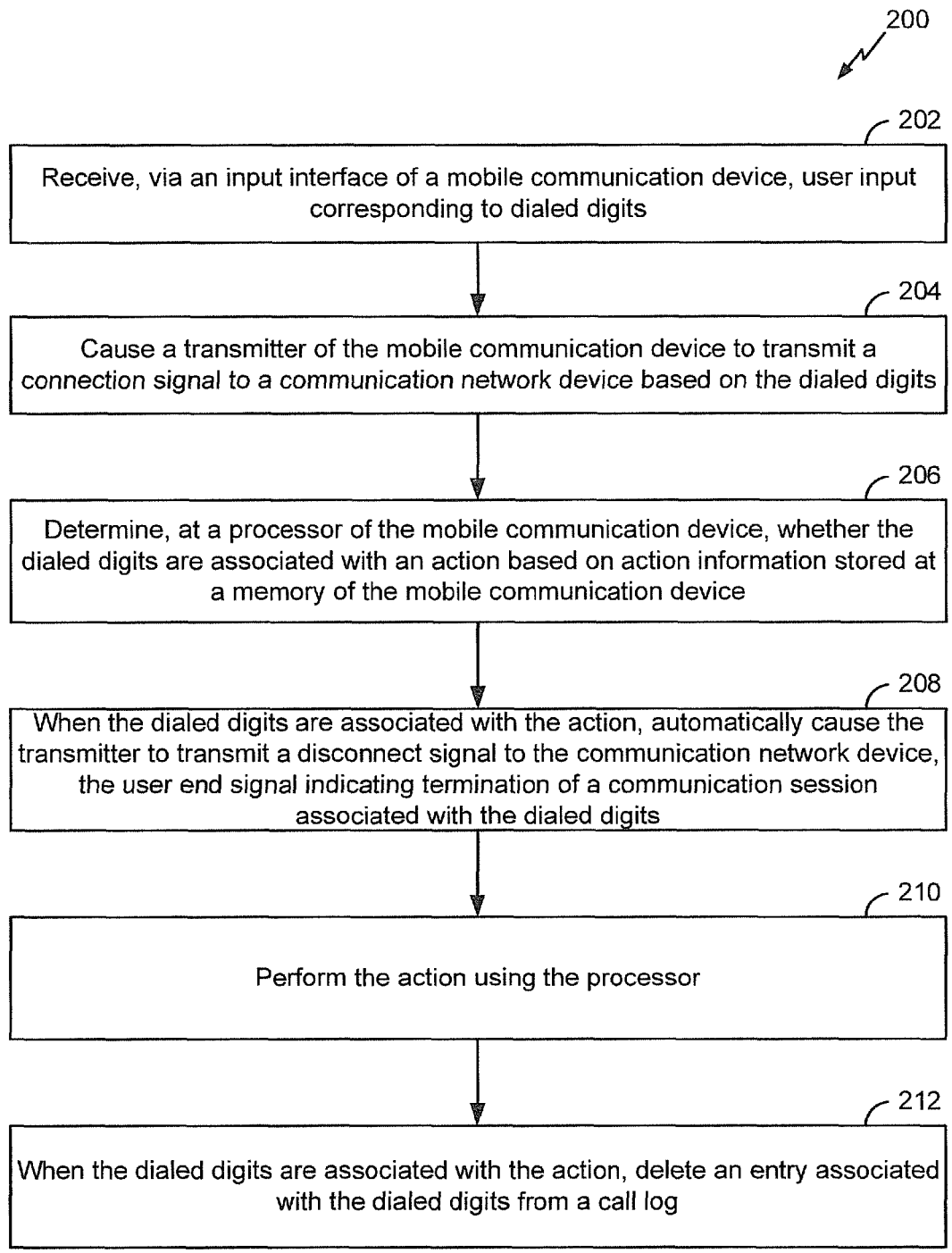
FIG. 2 is a flow chart that illustrates an embodiment of a method of performing an action in response to detecting dialed digits associated with an action.

FIG. 2 is a flow chart illustrating a particular embodiment of a method 200 of performing an action in response to detecting dialed digits associated with an action. The method 200 may be performed by the mobile communication device 102 of FIG. 1.

The method 200 includes receiving, via an input interface of a mobile communication device, user input corresponding to dialed digits, at 202. For example, a user of the mobile communication device 102 may enter the dialed digits via the input interface 106. Thus, the mobile communication device 102, or the processor 104 of the mobile communication device 102, may receive the dialed digits.

The method 200 includes causing a transmitter of the mobile communication device to transmit a connection signal to a communication network device based on the dialed digits, at 204. For example, the processor 104 of the mobile communication device 102 of FIG. 1 may cause the transmitter 108 to send the connection signal 126 in response to receiving the dialed digits or in response to receiving a send command after the dialed digits. Content of the connection signal may vary depending on a communication protocol used for communication between the mobile communication device and the communication network. To illustrate, the connection signal 126 may be an internet protocol message including destination information, such as a SIP message. In other protocols, such as Institute of Electrical and Electronics Engineers (IEEE) 802.11-type standards (e.g., Wi-Fi), cellular standards such as Long Term Evolution (LTE), Global System for Mobile Communications (GSM), etc., global positioning system (GPS)-type standards, near field communications (NFC)-type standards, code division multiple access (CDMA), time division multiple access (TDMA), frequency division multiple access (FDMA), orthogonal frequency division multiple access (OFDMA), single-carrier frequency division multiple access (SC-FDMA), enhanced data rates for GSM evolution (EDGE), evolved EDGE, Universal Mobile Telecommunications System (UMTS), general packet radio service (GPRS), 3rd generation partnership project (3GPP), 3GPP2, 4th generation (4G), 4G-LTE, another message or signal that indicates call setup to the communications network may be sent.

The method 200 includes determining, at a processor of the mobile communication device, whether the dialed digits are associated with an action based on action information stored at a memory of the mobile communication device, at 206. For example, the processor 104 of FIG. 1 may compare the dialed digits to the action information 120 to determine whether the dialed digits are associated with an action.

The method includes, when the dialed digits are associated with the action, automatically causing the transmitter to transmit a disconnect signal to the communication network device, at 208. The disconnect signal indicates termination of a communication session associated with the dialed digits. For example, the processor 104 of FIG. 1 may automatically cause the transmitter 108 to transmit the disconnect signal 128 (e.g., a user equipment initiated detach or end signal to terminate a communication session associated with the call set up signal) in response to the dialed digits being associated with the action.

The method includes performing the action using the processor, at 210. For example, the processor 104 of FIG. 1 may perform the action associated with the dialed digits in the action information 120 (e.g., launch an application).

The method may include, when the dialed digits are associated with the action, deleting an entry associated with the dialed digits from a call log, at 212. For example, the processor 104 of FIG. 1 may search the call log 118 for an entry associated with the dialed digits, and if an entry including the dialed digits is found, the processor 104 may delete the entry from the call log 118.

Thus, the method 200 of FIG. 2 illustrates using a mobile communication device to perform an action, such as loading an application, in response to a sequence of digits entered via an input interface. The action may be performed without notifying a user that the action has been performed. For example, the mobile communication device's display may not change when the application is launched. Further, the mobile communication device may delete a dialed sequence used to launch the application from a call log. Accordingly, the user is able to execute the application in an unintrusive, discreet manner.

Figure 3:
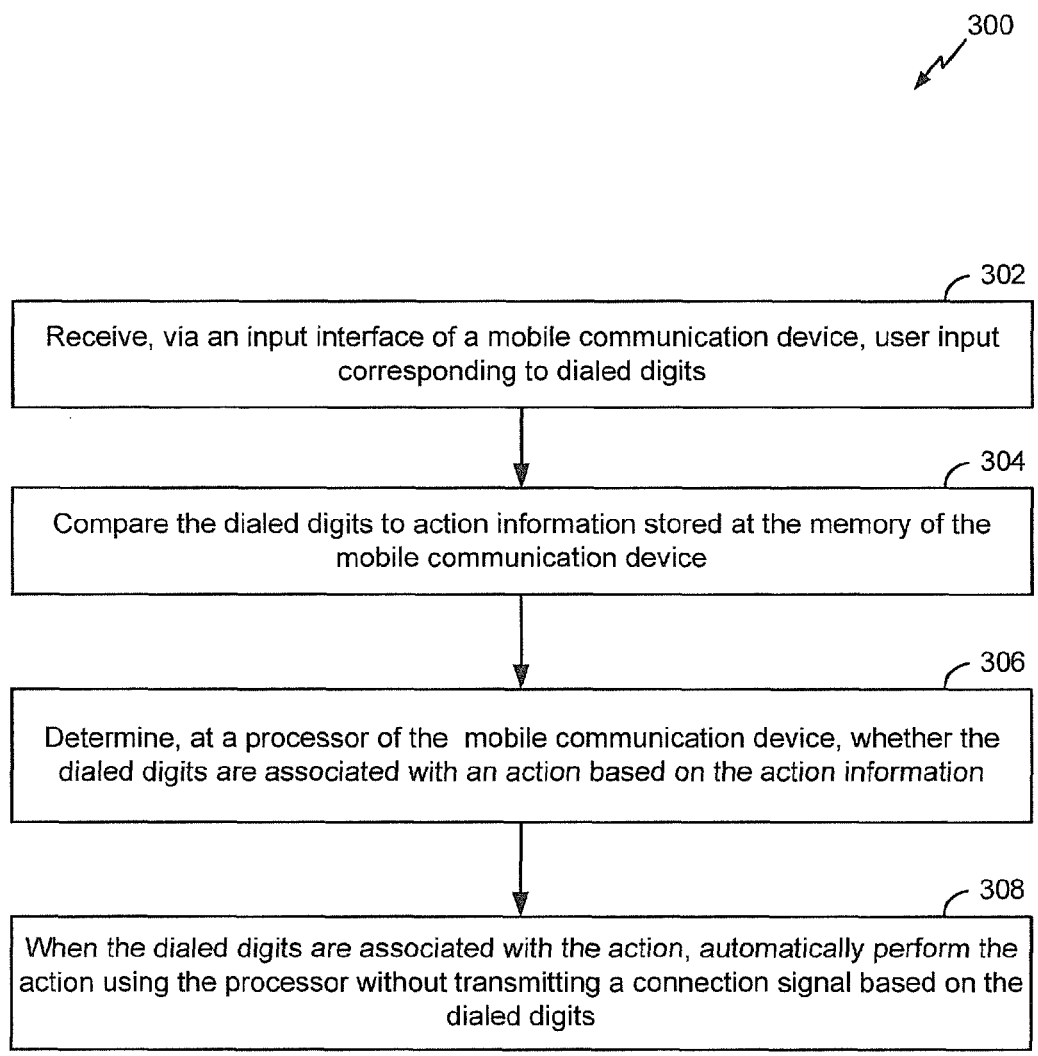
FIG. 3 is a flow chart that illustrates an embodiment of a method of performing an action in response to dialed digits being associated with an action.

FIG. 3 is a chart illustrating a particular embodiment of a method 300 to perform an action in response to dialed digits being associated with an action. The method 300 may be performed by the system 100 of FIG. 1.

The method 300 includes receiving, via an input interface of a mobile communication device, user input corresponding to dialed digits, at 302. For example, a user of the mobile communication device 102 may enter the dialed digits via the input interface 106. Thus, the mobile communication device 102 or the processor 104 of the mobile communication device 102 may receive the dialed digits.

The method 300 includes comparing the dialed digits to action information stored at the memory of the mobile communication device, at 304. For example, the processor 104 of FIG. 1 may compare the dialed digits to the action information 120 (including user defined dialed digits, actions, or both) stored in the memory 110. For example, the sequences of dialed digits may be compared to the action information without receiving an end sequence, such as non-numeric input (e.g., #, *, or send).

The method 300 includes determining, at a processor of the mobile communication device, whether the dialed digits are associated with an action based on the action information, at 306. For example, the processor 104 of FIG. 1 may determine whether the dialed digits are associated with an action based on the action information 120.

The method 300 includes, when the dialed digits are associated with the action, automatically performing the action using the processor without transmitting a connection signal based on the dialed digits, at 308. For example, the processor 104 of FIG. 1 may automatically perform the action, when the dialed digits are associated with the action in the action information 120. The processor 104 may perform the action without instructing the transmitter 108 to send the connection signal 126. Since in this case no connection signal 126 is transmitted, no disconnect signal 128 is needed. Also, the action may be performed without the user entering "send," which may or may not result in the dialed digits not being saved to a call log.

Thus, the method 300 of FIG. 3 illustrates using a mobile communication device to perform an action, such as loading an application, in response to receiving a sequence of digits entered via an input interface. The action may be performed without notifying a user that the action has been performed. For example, the mobile communication device's display may not change when the application is launched. Further, the mobile communication device may not enter a dialed sequence used to launch the application to a call log. Further, the mobile communication device may not generate a signal to a communications network. Thus, the communications network may not send an error message to the mobile communications device and the mobile communications device may not display an error message. Accordingly, the user is able to execute the application in an unintrusive manner.

Figure 4:
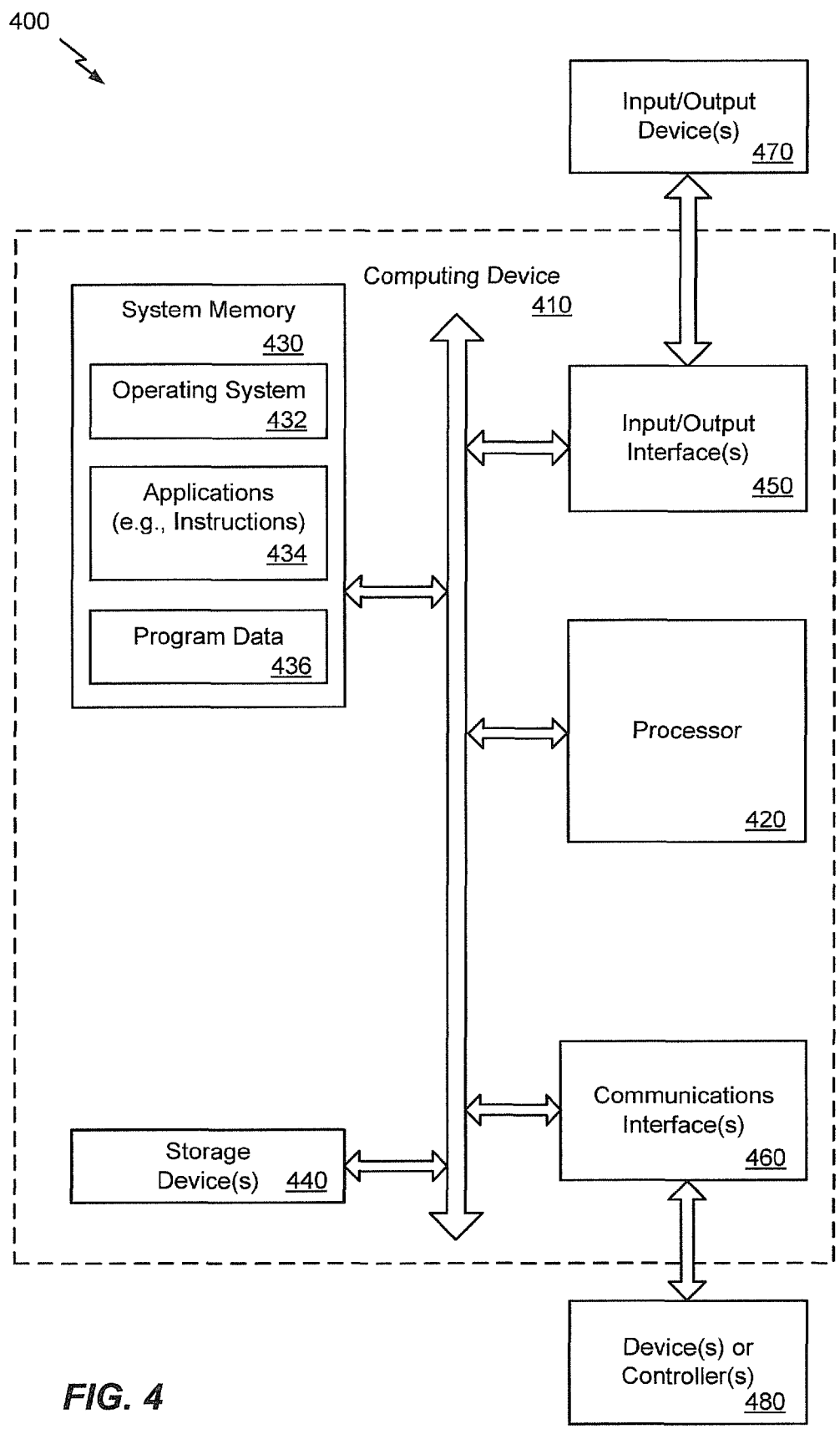
FIG. 4 is a block diagram that illustrates a particular embodiment of a computing system to perform an action in response to detecting dialed digits associated with an action.

FIG. 4 is a block diagram of a computing environment 400 including a computing device 410 operable to launch an application in response to a sequence of digits entered via an input interface. For example, the computing device 410 may be included within or correspond to the mobile communication device 102 of FIG. 1.

The computing device 410 may include at least one processor 420. Within the computing device 410, the at least one processor 420 may communicate with a system memory 430, one or more storage devices 440, one or more input/output interfaces 450, one or more communications interfaces 460, or a combination thereof.

The system memory 430 may include volatile memory devices (e.g., random access memory (RAM) devices), non-volatile memory devices (e.g., read-only memory (ROM) devices, programmable read-only memory, and flash memory), or both. The system memory 430 may include an operating system 432, which may include a basic input/output system for booting the computing device 410 as well as a full operating system to enable the computing device 410 to interact with users, other programs, and other devices. The system memory 430 may also include one or more applications (e.g., instructions) 434 and program data 436. The applications 434 may include instructions corresponding to one or more applications which may be launched in response to a sequence of digits entered via an input interface. The program data 436 may include data used by the applications 434 to perform respective functions of the applications 434. The program data 436 may also include action information 120 mapping a dialed sequence to particular applications.

The one or more storage devices 440 may include nonvolatile storage devices, such as magnetic disks, optical disks, or flash memory devices. The storage devices 440 may include both removable and non-removable memory devices. In a particular embodiment, the storage devices 440 may be configured to store the operating system 432, the applications 434, the program data 436, or a combination thereof. The system memory 430 and the storage devices 440 are physical devices and are not a signal.

In a particular embodiment, the at least one processor 420 is configured to execute computer executable instructions, such as the applications 434, stored at the system memory 430. The instructions may be executable to cause the at least one processor 420 to perform operations. The operations may include receiving, via the one or more input/output interfaces 450, user input corresponding to dialed digits. The operations may include causing the one or more input/output interfaces 450 to transmit (e.g., via the communications interface 460) a connection signal to a communication network device based on the dialed digits. The operations may include determining, at the processor 420, whether the dialed digits are associated with an action based on program data 436 stored at the system memory 430. The operations may include, when the dialed digits are associated with the action, automatically transmitting (e.g., via the communications interface 460) a disconnect signal to the communication network device, the disconnect signal indicating termination of a communication session associated with the dialed digits. The operations may include performing the action using the processor 420. The operations may include, when the dialed digits are associated with the action, deleting an entry associated with the dialed digits form a call log.

The one or more input/output interfaces 450 may enable the computing device 410 to communicate with one or more input/output devices 470 to facilitate user interaction. For example, the one or more input/output interfaces 450 may be adapted to receive input from a user, to receive input from another computing device, or a combination thereof. The input/output interfaces 450 may conform to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces. The input/output devices 470 may include user interface devices and displays, including some combination of buttons, keyboards, pointing devices, displays, speakers, microphones, touch screens, and other devices. The processor 420 may detect interaction events based on user input received via the input/output interfaces 450. Additionally, the processor 420 may send a display to a display device via the input/output interfaces 450.

The one or more communications interfaces 460 may enable the computing device 410 to communicate with one or more other computing devices or controllers 480. The one or more communications interfaces 460 may include wired Ethernet interfaces, Institute of Electrical and Electronics Engineers (IEEE) 802 wireless interfaces, Bluetooth communication interfaces, electrical (or power line) interfaces, optical or radio frequency interfaces, or other wired or wireless interfaces. The other computer devices or controllers 480 may include host computers, servers, workstations, portable computers, telephones, tablet computers, or any other communication device or component. For example, the other computer devices or controllers 480 may include communications network device 124 of FIG. 1.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may have been grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
   receiving, via an input interface of a mobile communication device, user input corresponding to dialed digits;
   transmitting, by the mobile communication device, a connection signal to a communication network device based on the dialed digits;
   determining, at a processor of the mobile communication device, whether the dialed digits indicate an action based on action information stored at a memory of the mobile communication device;
   when the dialed digits indicate the action, automatically transmitting, by the mobile communication device, a disconnect signal to the communication network device, the disconnect signal indicating termination of a communication session associated with the dialed digits; and
performing the action using the processor.

2. The method of claim 1, wherein the action includes activating an application.

3. The method of claim 1, wherein, when the dialed digits indicate the action, the dialed digits are not saved in a call log.

4. The method of claim 1, further comprising, when the dialed digits indicate the action, deleting an entry indicating the dialed digits from a call log.

5. The method of claim 1, wherein the action information includes an identifier of the action and a sequence of digits indicating the action, wherein the action and the sequence of digits are defined by a user.

6. The method of claim 1, wherein performance of the action is not detectable by a user of the mobile communication device.

7. The method of claim 1, wherein the input interface includes a touch screen interface, physical buttons, or both.

8. A mobile communication device comprising:
a processor; and
a memory including instructions that are executable by the processor to cause the processor to perform operations including:
receiving, via an input interface, user input corresponding to dialed digits;
transmitting a connection signal to a communication network device based on the dialed digits;
determining, at the processor, whether the dialed digits indicate an action based on action information stored at the memory;
when the dialed digits indicate the action, automatically transmitting a disconnect signal to the communication network device, the disconnect signal indicating termination of a communication session associated with the dialed digits; and
performing the action using the processor.

9. The mobile communication device of claim 8, wherein the dialed digits are compared to the action information before a send command is received.

10. The mobile communication device of claim 8, wherein, when the dialed digits indicate the action, the dialed digits are not saved in a call log.

11. The mobile communication device of claim 8, wherein performance of the action is not detectable by a user of the mobile communication device.

12. The mobile communication device of claim 8, wherein the action includes activating an application.

13. The mobile communication device of claim 12, wherein the application is a first application stored in the memory.

14. A non-transitory computer-readable memory including instructions that are executable by a processor to cause the processor to perform operations including:
receiving, via an input interface of a mobile communication device, user input corresponding to dialed digits;
transmitting, by the mobile communication device, a connection signal to a communication network device based on the dialed digits;
determining, at the mobile communication device, whether the dialed digits indicate an action based on action information stored at a memory;
when the dialed digits indicate the action, automatically transmitting, by the mobile communication device, a disconnect signal to the communication network device, the disconnect signal indicating termination of a communication session associated with the dialed digits; and
performing the action.

15. The non-transitory computer-readable memory of claim 14, wherein the action includes activating an application.

16. The non-transitory computer-readable memory of claim 14, wherein, the operations further include, when the dialed digits indicate the action, blocking entry of the dialed digits in a call log.

17. The non-transitory computer-readable memory of claim 14, further comprising when the dialed digits indicate the action, deleting an entry indicating the dialed digits from a call log.

18. The non-transitory computer-readable memory of claim 14, wherein the action information includes an identifier of the action and a sequence of digits indicating the action, wherein the action and the sequence of digits are defined by a user.

19. The non-transitory computer-readable memory of claim 14, wherein the processor does not generate a user detectable indication responsive to performance of the action.

20. The non-transitory computer-readable memory of claim 14, wherein the input interface includes a touch screen interface, physical buttons, or both.

* * * * *